UNITED STATES PATENT OFFICE.

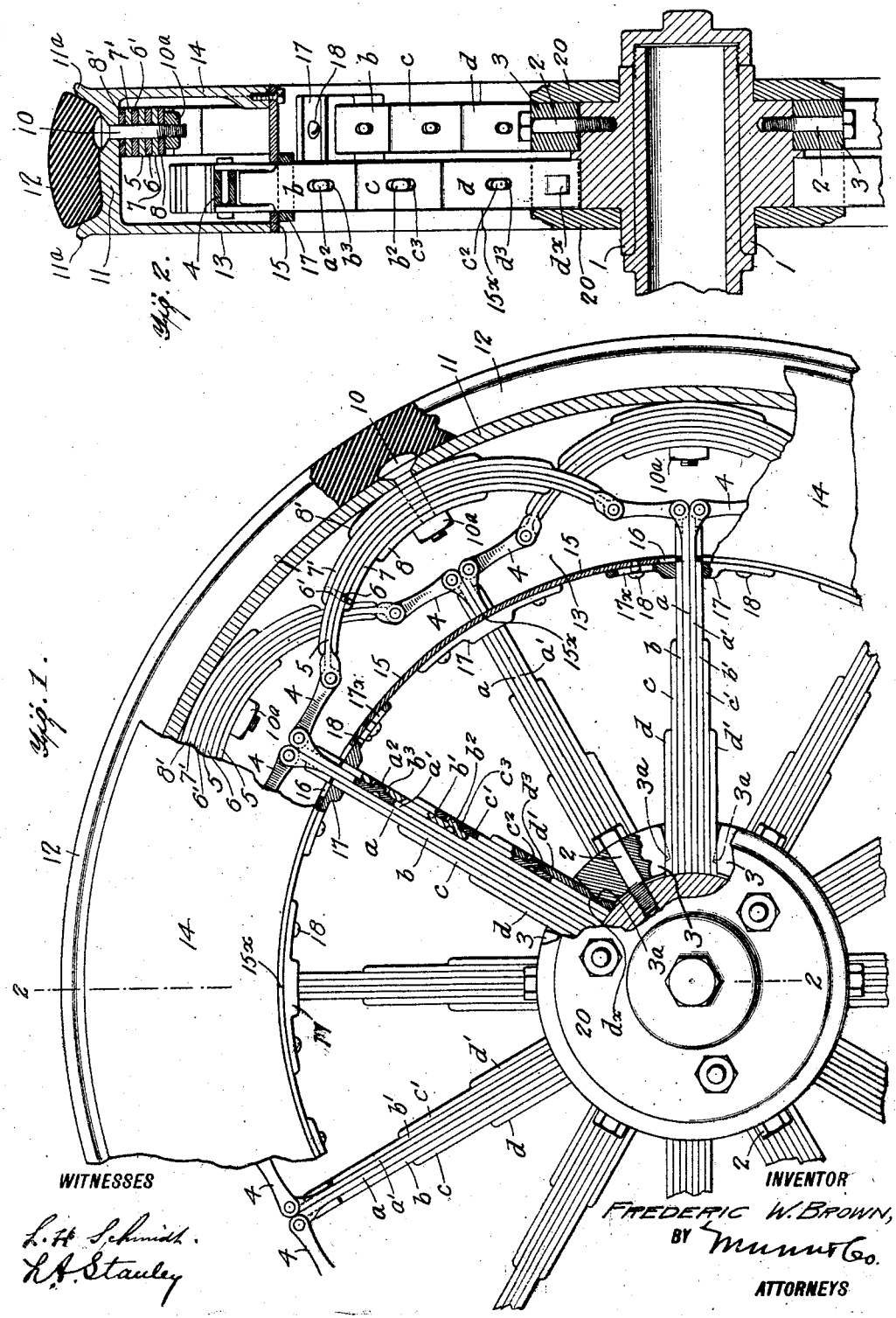

FREDERIC W. BROWN, OF NEW ORLEANS, LOUISIANA, ASSIGNOR OF ONE-FOURTH TO ANTHONY TEN EYCK BROWN, OF ATLANTA, GEORGIA, AND THREE-TWENTIETHS TO LYDIA M. BROWN, OF NEW ORLEANS, LOUISIANA.

SPRING-WHEEL.

1,047,741.  Specification of Letters Patent.  Patented Dec. 17, 1912

Application filed February 8, 1912. Serial No. 676,267.

*To all whom it may concern:*

Be it known that I, FREDERIC W. BROWN, a citizen of the United States, and a resident of New Orleans, in the parish of Orleans and State of Louisiana, have made certain new and useful Improvements in Spring-Wheels, of which the following is a specification.

My invention relates to improvements in spring wheels, and it consists in the constructions, combinations, and arrangements herein described and claimed.

An object of my invention is to provide a device which will simulate closely the action of a pneumatic tire, and which has certain other advantages in addition that the pneumatic tire does not possess.

A further object of my invention is to provide a spring wheel of comparatively simple construction, and so arranged that portions may be easily taken apart or assembled whenever occasion requires.

A further object of my invention is to provide a device of a more elastic nature than that afforded by the ordinary wheel with a pneumatic tire, thereby giving to the wheel certain new functions not found in the ordinary wheel.

Other objects and advantages will appear in the following specification and the novel features of the invention will be particularly pointed out in the appended claims.

My invention is illustrated in the accompanying drawings forming part of this application in which—

Figure 1 is a side view of a portion of the wheel certain parts being broken away and in section for the sake of clearness, and Fig. 2 is a sectional view of a portion of the wheel, along the line 2—2 of Fig. 1.

In carrying out my invention I provide a central hub 1 of wood, metal or any other suitable material, which is tapped at various portions of its circumference to receive bolts 2. The latter are designed to hold wedge-shaped members 3, each of said wedge-shaped members being provided with shoulders $3^a$ on their opposite sides as shown in Fig. 1.

Disposed between adjacent wedges are the springs which constitute the spokes of the wheel. In Fig. 1 it will be apparent that there are two springs $a$ and $a'$ whose surfaces are in contact, but which are not connected with each other, being adapted to slide upon one another as will be herein pointed out. On one side of the spring $a$ is a shorter spring $b$, while the spring $b'$ is adjacent to the spring $b$. Similarly the springs $c$ and $d$ and $c'$ and $d'$ are disposed in the manner shown in the figure so as to make the combined thickness of the series of springs greatest near the hub. The outer springs $d$ and $d'$ have slight recesses in their sides arranged to permit the entrance of the shoulder $3^a$ of the wedge member 3. The springs have stamped lugs such as that shown at $a^2$ and $b^2$ arranged to enter slots such as that shown at $b^3$ and $c^3$ to prevent the lateral displacement of the springs, while permitting a slight longitudinal movement.

The central springs $a$ and $a'$ are flared outwardly at their upper ends to form eyes arranged to receive pins for holding the links 4 which connect these springs with the central member 5 of a series of springs 6, 6', 7, 7' and 8, 8'. These springs are fastened by means of a bolt 10 to a rim 11. The bolt is elongated in a direction parallel to the plane of the wheel as will be seen by comparing Figs. 1 and 2, and therefore will not turn when the nut $10^a$ is screwed up.

As will be seen from Fig. 2 the rim 11 is provided with the usual flanges $11^a$ for holding the tire 12, which, in the present instance, is shown as solid rubber, but may be a cushion tire or pneumatic tire as desired. The provision of the springs renders the use of the cushion or pneumatic tire less necessary than would be the case with a solid wheel. Extending inwardly from the rim are the integral side plates 13 and 14. Secured to the inner ends of the side plates 13 and 14 is an inner rim 15 having elongated openings such as those shown at 16 through which the spring spokes extend. On the inner side of the rim 15 are slidable plates 17 provided with slots $17^x$ through which screws 18 project, these screws serving to permit the movement of the plate 17 through which the spring spokes extend.

An inspection of Fig. 2 will show that the rim 11 is wide enough for the provision of two sets of arc-shaped springs, such as those shown at 5, 6, 6', 7, 7', 8, 8', alternate sets of arc-shaped springs being connected to the ends of alternate spring spokes in the manner already described.

From the foregoing description of the various parts of the device, the operation thereof may be readily understood.

In assembling the wheel the spring spokes are placed together, the lugs such as $a^2$, $b^2$, etc., entering the slots such as $b^3$, $c^3$, etc., to get the springs into alinement. After all of the springs are assembled, the wedge blocks 3 are tightened, the shoulders $3^a$ being forced into the recesses $d^x$ in the outer shorter springs $d$ and $d'$. This positively prevents the working of the spokes out from the sockets formed between adjacent wedges. The curved springs are secured by means of the bolts 10 and are fastened to the ends of the spring spokes as described. The screws 18 are adjusted so as to permit the plates 17 to have a slight movement. Consider now the action of the wheel in starting. Let us assume that the wheel is used as a driving wheel for an automobile. When power is applied the tendency of the spokes will be to bend slightly. Moreover one of the central spokes such as $a$ will have a slight movement on its companion spoke $a'$. This tendency to bend slightly until the tension of the spring overcomes the tractive force takes up the jar and strain which would otherwise occur in a wheel of a more rigid type. The result is that in a sudden throwing of the clutch the wheel gives slightly and does not rack or jar the mechanism to the extent that the ordinary wheel does.

Now consider the action of the wheel due to the weight of the load upon it. The connection of the curved springs to the spring spokes tends to distribute the strains throughout the wheel. It will be found that nearly all of the springs are bent out of their normal position, i. e., the position which they would assume if there were no weight on the wheel. Thus springs in the direct line of strain will of course be flexed a greater amount than those farther away, but the construction is such that all the springs are in play at least to some extent whenever the wheel is on the ground. Of course, since the strain is divided up among so many springs each spring has comparatively little of the strain to carry. The result is that the wheel has the greatest resiliency, and therefore does not require the use of pneumatic tires. The lugs $a^2$, $b^2$, etc., prevent the lateral movement of the springs which form parts of the spring spokes. I have called attention to the fact that the two central springs such as $a$ and $a'$ slide upon one another and it is advisable to put some sort of lubricant, preferably graphite between these two springs to facilitate this movement.

The provision of the slidable plate 17 prevents the lateral displacement of the spokes at right angles to the plane of the wheel, but permits the bending of the spokes in the plane of the wheel. The side plates 20 also tend to prevent the displacement of the inner end of the spring spokes from their position.

The inner rim 15 is made in sections, the ends of these sections abutting at the points $15^x$ as shown in Fig. 1. This is for the purpose of assembling the device. The rim 15, together with the side plates 14 forms a protective casing for the arc-shaped springs and for the ends of the spring spokes, thereby preventing mud and dirt from interfering with the proper working of these parts.

I claim:—

1. In a spring wheel, a central hub, a series of flat springs secured to said hub, said springs being divided into groups, each group having a pair of inner long springs and springs progressively shorter on each side of said inner long springs, a series of arc-shaped springs secured to the outer rim at their central portions, one of the long springs of a group being connected to the end of an arc-shaped spring and the other long spring of the same group being connected to the end of another arc-shaped spring.

2. In a spring wheel, a central hub, spokes radiating therefrom, each of said spokes comprising a series of flat springs, an outer rim, and two series of arc-shaped springs secured to said rim, the ends of one of said series being pivotally connected to the ends of alternate spring spokes, and the ends of the other series being pivotally connected to the ends of the remaining spring spokes, one of said series of arc-shaped springs and the radiating spokes connected therewith being substantially in the same plane, and the other series of arc shaped springs and the remaining radiating spokes being substantially in another plane.

3. In a spring wheel, a central hub, spokes therefor, each of said spokes comprising a group of flat springs, the central members of the group of springs being relatively long, and the outer members being progressively shorter in length, means for securing the spring spokes to the hub, said means comprising a series of wedge-shaped blocks disposed between the spokes and means for drawing the blocks toward the hub, an outer rim, an arc-shaped spring secured to said outer rim, a link pivotally connecting the ends of said arc-shaped spring with the central springs of certain of said spokes, and means for preventing the lateral movement of said spring spokes at right angles to the plane of the wheel, said means permitting the movement of said spring spokes in the direction parallel to the plane of the wheel.

4. In a spring wheel, a central hub, spokes therefor, each of said spokes comprising a group of flat springs, the central members of the group of springs being relatively long, and the outer members being progressively shorter in length, means for securing the spring spokes to the hub, said means comprising a series of wedge-shaped blocks disposed between the spokes and means for drawing the blocks toward the hub, an outer rim, an arc-shaped spring secured to said outer rim, a link pivotally connecting the ends of said arc-shaped spring with the central springs of certain of said spokes, side plates extending inwardly from said outer rim, a slotted inner rim carried by said side plates, the ends of said spring spokes projecting through said slotted inner rim, and a plate slidably secured to the inner portion of said inner rim and arranged to permit the movement of said spring spoke in a direction parallel to the plane of the wheel but to prevent the movement of the spoke in a direction at right angles to the plane of the wheel.

5. In a spring wheel, a central hub, spokes radiating therefrom, each of said spokes comprising a series of flat springs, an outer rim, and two series of arc-shaped springs secured to said rim, the ends of one of said series being pivotally connected to the ends of alternate spring spokes, and the ends of the other series being pivotally connected to the ends of the remaining spring spokes.

FREDERIC W. BROWN.

Witnesses:
 L. A. STANLEY,
 SOLON C. KEMON.